United States Patent
Vajapeyam et al.

(10) Patent No.: US 9,608,774 B2
(45) Date of Patent: Mar. 28, 2017

(54) OPPORTUNISTIC HARQ REPETITION FOR COVERAGE ENHANCEMENT

(71) Applicant: QUALCOMM Incorporated, San Diego, CA (US)

(72) Inventors: Madhavan Srinivasan Vajapeyam, San Diego, CA (US); Hao Xu, San Diego, CA (US); Wanshi Chen, San Diego, CA (US); Xiaoxia Zhang, San Diego, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 57 days.

(21) Appl. No.: 14/505,176

(22) Filed: Oct. 2, 2014

(65) Prior Publication Data

US 2015/0098418 A1 Apr. 9, 2015

Related U.S. Application Data

(60) Provisional application No. 61/886,485, filed on Oct. 3, 2013.

(51) Int. Cl.
*H04W 4/00* (2009.01)
*H04W 72/04* (2009.01)
(Continued)

(52) U.S. Cl.
CPC .............. *H04L 1/1816* (2013.01); *H04L 1/16* (2013.01); *H04L 1/189* (2013.01); *H04L 1/1819* (2013.01);
(Continued)

(58) Field of Classification Search
CPC ... H04L 1/1812; H04L 5/0055; H04L 1/1616; H04L 1/1819; H04L 1/189;
(Continued)

(56) References Cited

U.S. PATENT DOCUMENTS 9,094,960 B2 * 7/2015 He .................... H04W 72/0406
9,130,784 B2 * 9/2015 Nimbalker et al.
(Continued)

FOREIGN PATENT DOCUMENTS

EP 2296304 A2 3/2011

OTHER PUBLICATIONS

Alcatel-Lucent: "Multi-Process Transmission Technique to Improve Uplink Coverage for LTE", 3GPP Draft; R1-080443, 3rd Generation Partnership Project (3GPP), Mobile Competence Centre ; 650, Route Des Lucioles ; F-06921 Sophia-Antipolis Cedex ; France, vol. RAN WG1, No. Sevilla, Spain; 20080109, Jan. 9, 2008 (Jan. 9, 2008), XP050108961, [retrieved on Jan. 9, 2008].
(Continued)

*Primary Examiner* — Ayaz Sheikh
*Assistant Examiner* — Debebe Asefa
(74) *Attorney, Agent, or Firm* — Patterson & Sheridan, L.L.P.

(57) ABSTRACT

Certain aspects of the present disclosure provide techniques opportunistic retransmissions. According to certain aspects, a user equipment (UE) may transmit data associated with a first hybrid automatic repeat request (HARQ) process, receive signaling indicating the UE is to retransmit the data in at least one subframe not belonging to the first HARQ process, and retransmit the data on the at least one subframe. According to certain aspects, a base station (BS) may schedule a UE to transmit data on a first HARQ process and signal the UE to retransmit the data in at least one subframe not belonging to the first HARQ process.

26 Claims, 11 Drawing Sheets

(51) Int. Cl.
*H04L 1/18* (2006.01)
*H04L 1/16* (2006.01)

(52) U.S. Cl.
CPC .......... *H04L 1/1822* (2013.01); *H04L 1/1854* (2013.01); *H04L 1/1887* (2013.01); *H04L 1/1893* (2013.01); *H04L 1/1896* (2013.01); *H04W 4/005* (2013.01); *H04W 72/042* (2013.01); *H04L 1/1812* (2013.01)

(58) Field of Classification Search
CPC ... H04L 1/1887; H04L 1/1893; H04L 1/1816; H04L 1/1864; H04L 1/1854; H04L 1/16; H04L 1/1896; H04W 72/042; H04W 4/005
See application file for complete search history.

(56) References Cited

U.S. PATENT DOCUMENTS 9,191,180 B2* 11/2015 Seo .................. H04L 1/1822
2013/0250869 A1 9/2013 Eriksson

OTHER PUBLICATIONS

International Search Report and Written Opinion—PCT/US2014/059021—ISA/EPO—Dec. 16, 2014.
LG Electronics: "Alternative Uplink Synchronous HARQ schemes", 3GPP TSG RAN WG1 #46BIS, Seoul, Korea, vol. R1-062573, Oct. 9, 2006 (Oct. 9, 2006), pp. 1-4, XP003023535, figure 4 section 2.4.

* cited by examiner

OPPORTUNISTIC HARQ REPETITION FOR COVERAGE ENHANCEMENT

CROSS-REFERENCE TO RELATED APPLICATIONS

This application claims benefit of U.S. Provisional Patent Application Ser. No. 61/886,485, entitled "Opportunistic HARQ Repetition for Coverage Enhancement," filed Oct. 3, 2013, which is assigned to the assignee hereof and the contents of which are hereby incorporated by reference.

BACKGROUND

I. Field

Certain aspects of the present disclosure generally relate to wireless communications and, more particularly, to techniques for uplink channel coverage enhancements.

I. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

Wireless devices comprise user equipments (hereinafter "UEs") and remote devices. A UE is a device that operates under direct control by humans. Some examples of UEs include cellular phones, smart phones, personal digital assistants (PDAs), wireless modems, handheld devices, laptop computers, netbooks, etc. A remote device is a device that operates without being directly controlled by humans. Some examples of remote devices include sensors, meters, location tags, etc. A remote device may communicate with a base station, another remote device, or some other entity. Machine type communication (MTC) refers to communication involving at least one remote device on at least one end of the communication.

SUMMARY

Certain aspects of the present disclosure provide a method for wireless communications which may be performed, for example, by a UE. The method generally includes transmitting data associated with a first hybrid automatic repeat request (hereinafter "HARQ") process, receiving signaling indicating the UE is to retransmit the data in at least one subframe not belonging to the first HARQ process, and retransmitting the data on the at least one subframe.

Certain aspects of the present disclosure provide a method for wireless communications which may be performed, for example, by a base station (hereinafter "BS"). The method generally includes scheduling a UE to transmit data on a first HARQ process and signaling the UE to retransmit the data in at least one subframe not belonging to the first HARQ process.

Numerous other aspects are provided including apparatus, systems, computer program products, and processing systems capable of performing operations for the methods described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Aspects of the present disclosure provide techniques and apparatus for enhancing uplink channel coverage for certain user equipments (e.g., low cost, low data rate UEs).

For some systems, certain types of UEs may have limited coverage relative to other types of UEs. For example, some types of low cost UEs may have only a single receive or transmit chain, thereby limiting DL and/or UL coverage, while other types of UEs benefit from multiple receive and/or transmit chains. For example, some UEs may be operating in VOIP (Voice over IP) mode when the user is at a remote location or in locations such as basement. As another example, some UEs may be operating in high frequency.

Techniques presented herein may help enhance coverage to such UEs.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

An Example Wireless Communication System

Figure 1:
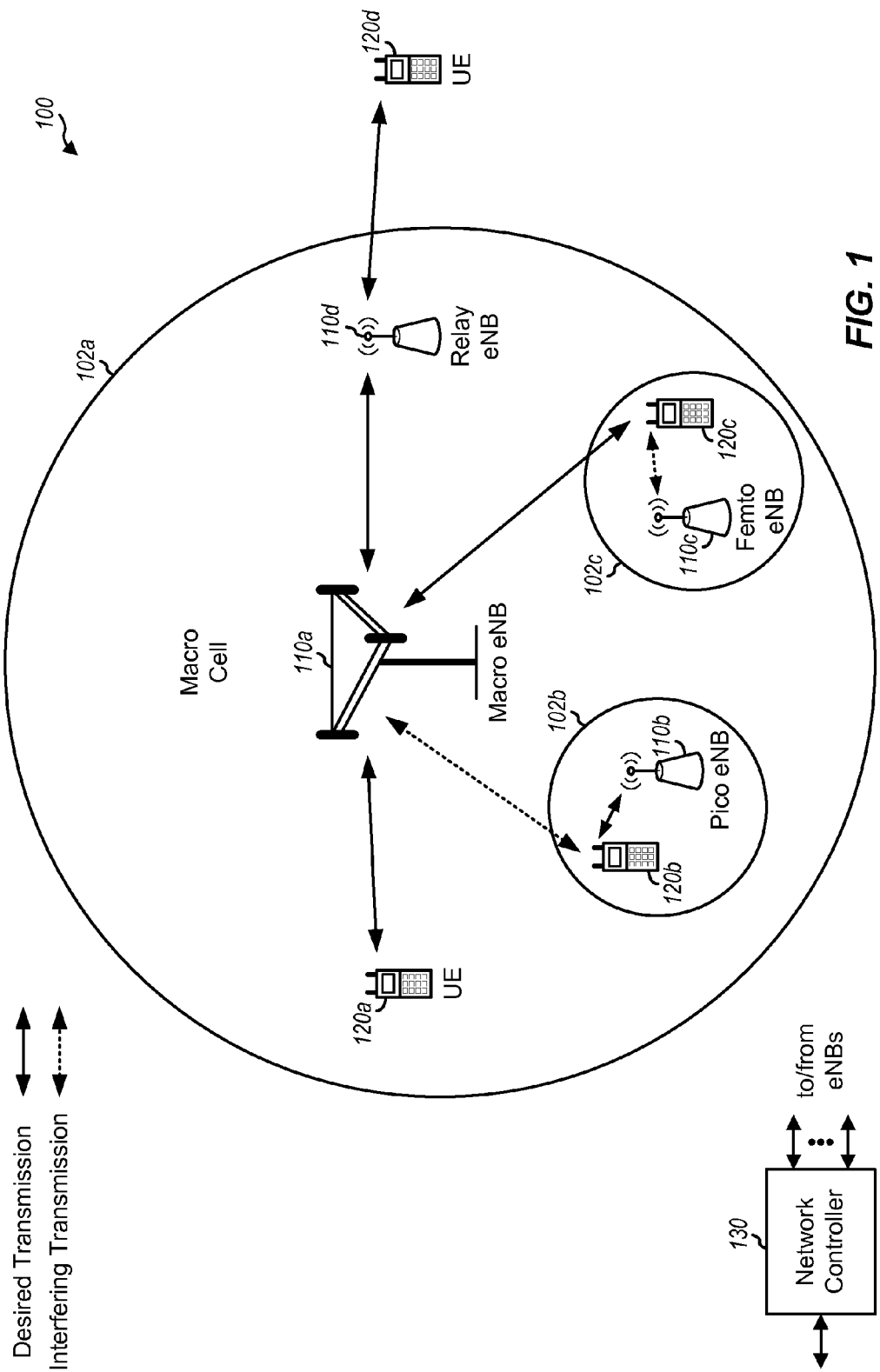
FIG. 1 is a block diagram conceptually illustrating an example wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with UEs and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc.

Figure 2:
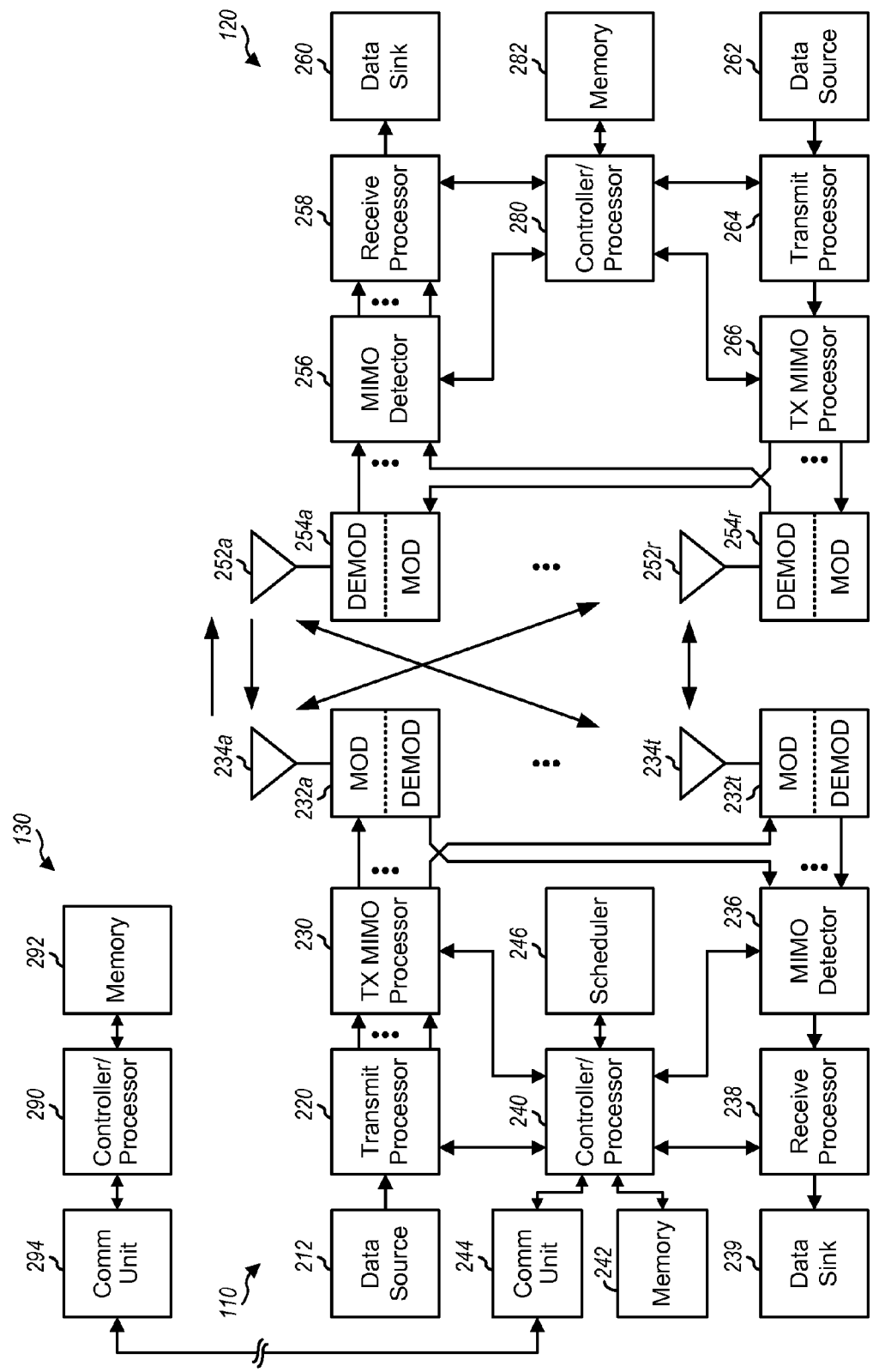
FIG. 2 is a block diagram conceptually illustrating an example of an evolved node B (eNB) in communication with a UE in a wireless communications network, in accordance with certain aspects of the present disclosure.

FIG. 2 is a block diagram of a design of base station/eNB 110 and UE 120, which may be one of the base stations/eNBs and one of the UEs in FIG. 1. Base station/eNB 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

When transmitting data to the UE 120, the base station 110 may be configured to determine a bundling size based at least in part on a data allocation size and precode data in bundled contiguous resource blocks of the determined bundling size, wherein resource blocks in each bundle may be precoded with a common precoding matrix. That is, reference signals (RSs) such as UE-RS and/or data in the resource blocks may be precoded using the same precoder. The power level used for the UE-RS in each resource block (RB) of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous RBs, wherein at least one reference signal in resource blocks in each bundle are precoded with a common precoding matrix, estimate at least one precoded channel based on the determined bundling size and one or more RSs transmitted from the base station, and decode the received bundles using the estimated precoded channel.

Figure 3:
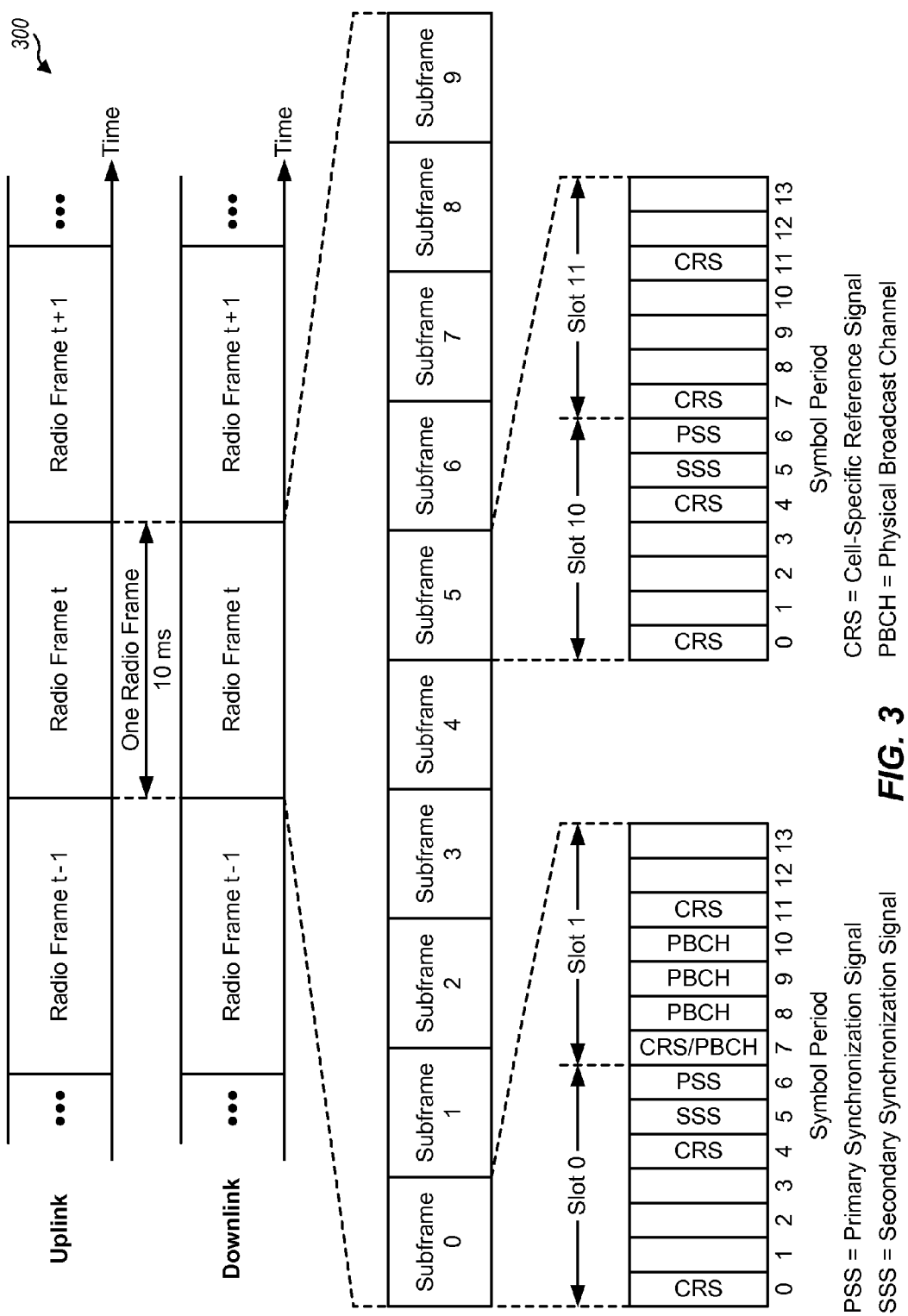
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
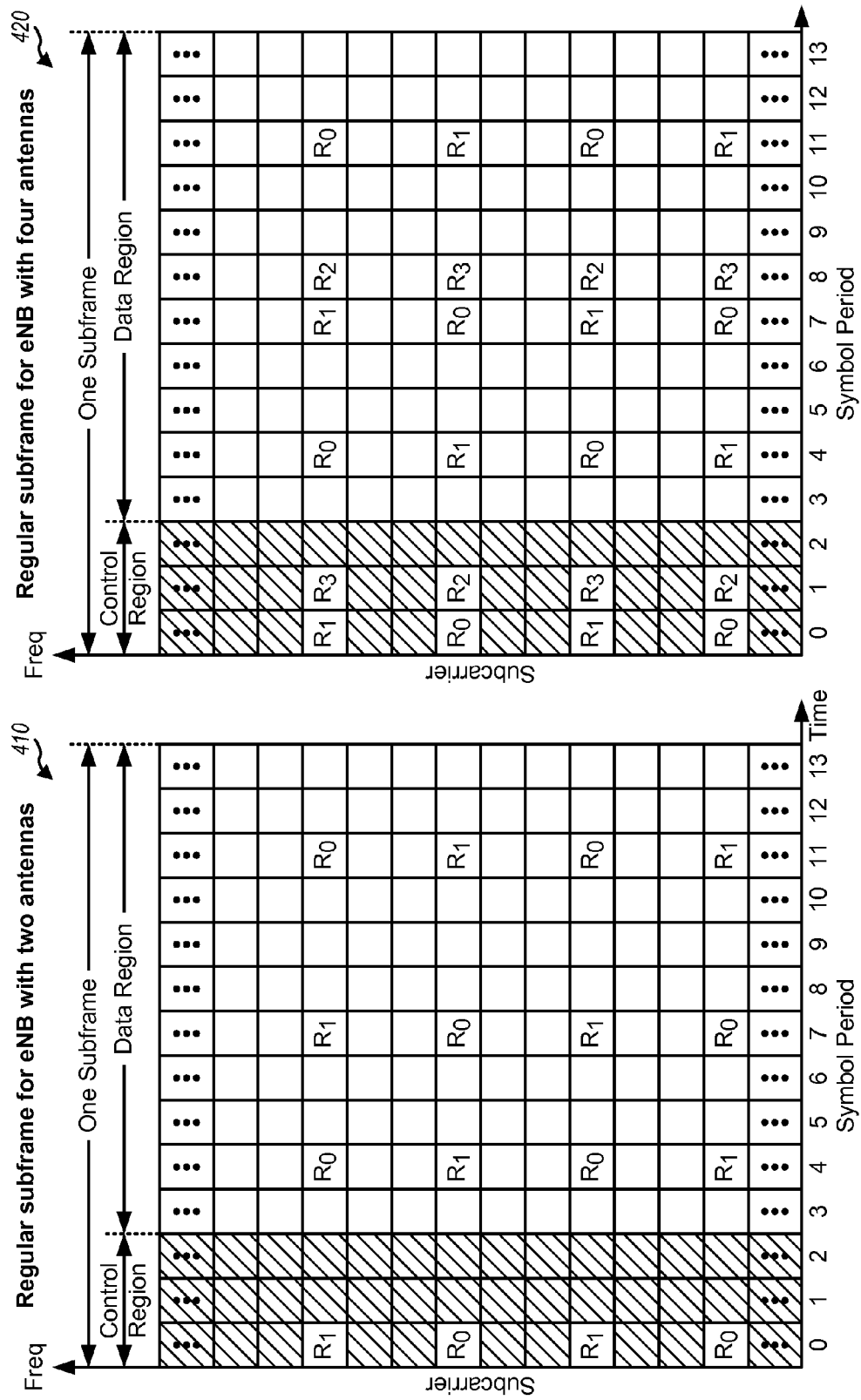
FIG. 4 illustrates an example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

Example Uplink Channel Coverage Enhancements

Aspects of the present disclosure may be used to provide for enhanced uplink channel coverage, for example, by utilizing a flexible repetition mode for uplink transmissions (e.g., RACH or PUSCH transmissions) and downlink transmissions. The techniques described herein may provide for enhanced uplink coverage for machine type communication (MTC) devices as well as other types of devices that may have limited uplink coverage.

The focus of the traditional LTE design is on the improvement of spectral efficiency, ubiquitous coverage, enhanced quality of service (QoS) support, and so on. Current LTE system downlink (DL) and uplink (UL) link budgets are designed for coverage of high end devices, such as state-of-the-art smartphones and tablets, which may support a large DL and UL link budget. However, low cost, low rate devices need to be supported as well. For example, for machine type communications (MTC), maximum bandwidth may be reduced, a single receive radio frequency (RF) chain may be used, peak rate may be reduced, transmit power may be reduced, and half duplex operation may be performed.

In LTE Release 8, transmission time interval (TTI) (subframe) bundling may be configured on a per-UE basis. The subframe bundling operation is configured by the parameter ttiBundling, which is provided by higher layers. Typically, TTI bundling is performed by sending data from a UE in an uplink shared channel over multiple TTIs to the base station, bundling is not applied to other uplink signals/traffic (e.g., uplink control information). The bundling size is fixed at 4 TTIs (subframes), that is, the physical uplink control channel (PUSCH) is transmitted in four consecutive subframes. The same hybrid automatic repeat request (HARQ) process number is used in each of the bundled subframes. The resource allocation size is restricted to no more than three resource blocks (RBs). The modulation order is set to 2 (quadrature phase-shift keying (QPSK)). Each bundle is treated as a single resource, for example, a single grant and a single HARQ acknowledgment are used each bundle.

TTI bundling is typically used for low rate traffic. For example, if voice over internet protocol (VoIP) packets cannot be transmitted in a single TTI due to a low uplink link budget, Layer 2 (L2) segmentation may be applied. For example, a VoIP packet may be segmented in four radio link control (RLC) protocol data units (PDUs) that are transmitted in four consecutive TTIs. 2-3 HARQ retransmissions may be targeted to achieve sufficient coverage.

In TTI bundling, the UE typically transmits new HARQ redundancy versions (RV) without waiting for HARQ feedback from the eNB, which may improve delay performance, albeit at the potential cost of early termination gain.

Fixed TTI bundling modes have some limitations. For example, TTI bundling may involve a rigid HARQ timeline. Since only a fixed size of 4 TTIs can be bundled, TTI bundling may lack flexibility for resource allocation. This is because fixed TTI bundling modes transmit a predetermined number of transmissions without regards to whether an ACK was received for a transmission prior to the final bundled transmission. On the UE side, TTI bundling may entail bundling all PUSCH transmissions.

Aspects of the present disclosure provide a repetition mode that may be implemented to provide for LTE uplink coverage enhancement. According to certain aspects, the repetition mode may allow for a flexible number of TTIs to be bundled based on UE coverage requirements and still take advantage of early termination. Such repetition modes may have relatively little impact on standards and, in some cases, may be implemented for both frequency division duplex (FDD) and time division duplex (TDD) communications.

Figure 5:
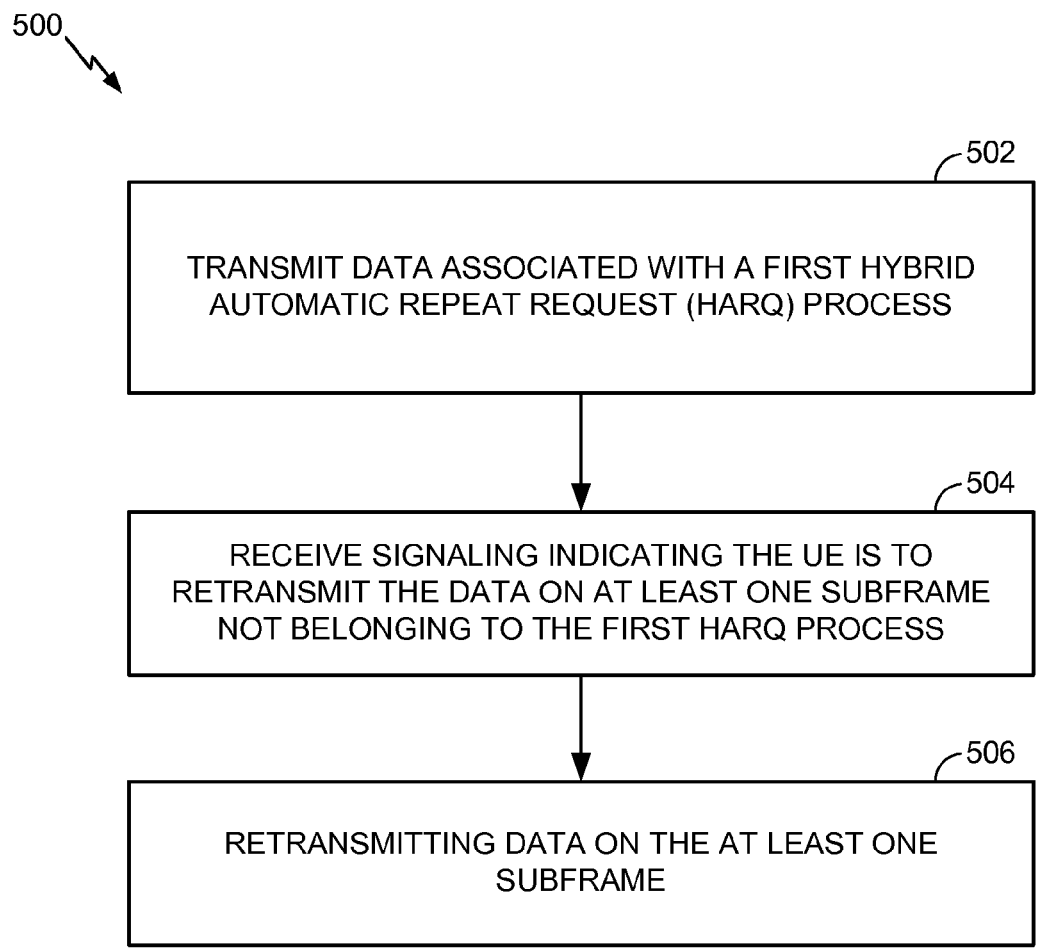
FIG. 5 illustrates example operations for wireless communications which may be performed, for example, by a UE, in accordance with certain aspects of the present disclosure.
Figure 6:
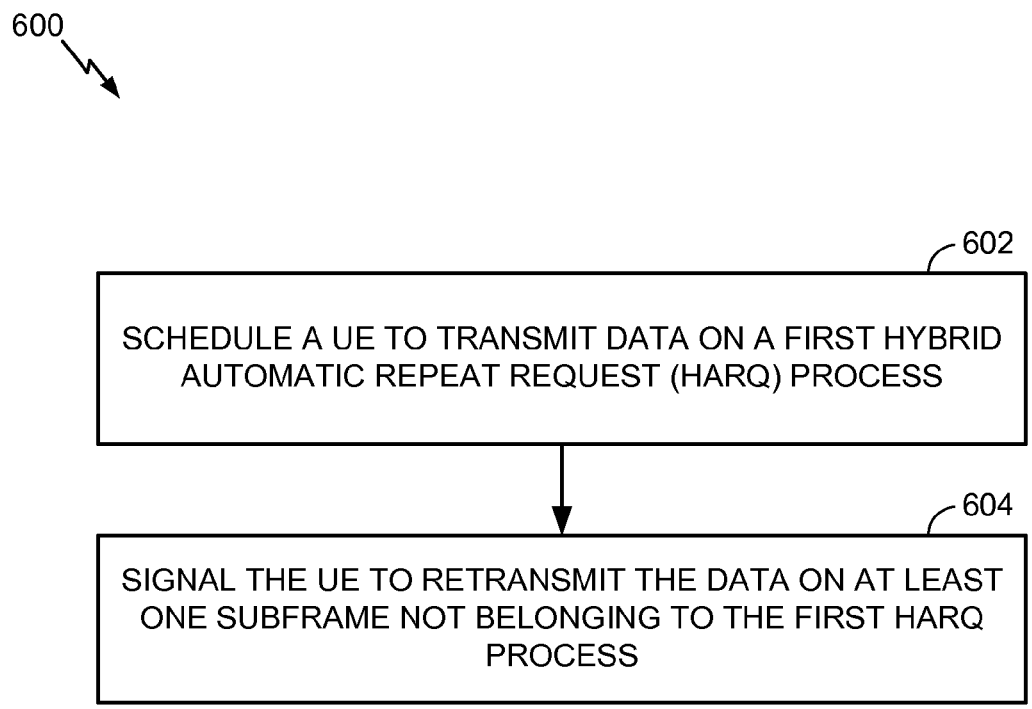
FIG. 6 illustrates example operations for wireless communications which may be performed, for example, by a BS, in accordance with certain aspects of the present disclosure.

FIG. 5 illustrates example operations 500 for opportunistic re-transmissions which may be performed, for example, by a user equipment (UE), in accordance with certain aspects of the present disclosure. The operations 500 begin, at 502, by transmitting data associated with a first hybrid automatic repeat request (HARQ) process. At 504, the UE receives signaling indicating the UE is to retransmit the data in at least one subframe not belonging to the first HARQ process. At 506, the UE retransmits the data on the at least one subframe FIG. 6 illustrates example operations 600 or opportunistic re-transmissions which may be performed, for example, by a base station (BS), in accordance with certain aspects of the present disclosure. The operations 600 begin, at 602, by scheduling a UE to transmit data on a first HARQ process. At 604, the base station signals the UE to retransmit the data in at least one subframe not belonging to the first HARQ process.

While examples are described with reference to opportunistic repeating of UL HARQ transmissions, those skilled in the art will appreciate that the techniques presented herein may also be readily extended to DL HARQ transmissions.

In certain aspects, the repetition may be referred to as opportunistic because it takes advantage of unused subframes to repeat a transmission of a HARQ process. For example, the subframes may belong to other HARQ processes, TTI bundling processes, or just unused subframes not belonging to any other process.

HARQ repetition may involve transmitting the same (encoded) data multiple times. The transport block (TB), modulation and coding scheme (MCS), and bundling may be unchanged in the repeated transmission. Thus, the data may be re-transmitted without additional encoding. In certain aspects, HARQ processes may be maintained separately, and for each HARQ process, acknowledgements and negative acknowledgments (e.g., via PHICH) may be signaled separately.

In certain aspects, HARQ repetition may be dynamically triggered, for example on a per-process basis. Subframes used for repeating may not be predetermined but, rather, may be determined opportunistically, for example, based on an early termination state of HARQ processes. In certain aspects, any free HARQ process may be used as a repeater process at any time.

To support opportunistic repetition, a BS may send a UE signaling indicating that it is to retransmit the data associated with a first HARQ process using one or more subframes that do not belong to that process. In certain aspects, such signaling may be provided via downlink control information (DCI). For example, a modified DCI format 0 (DCI0) message (which may be referred to as DCI0*) transmitted on a downlink control channel (e.g., PDCCH, EDCCH, or other control channels) may provide to a UE signaling indicating that it is to retransmit the data associated with a first HARQ process using one or more subframes that do not belong to the first HARQ process. In some cases, opportunistic re-transmission modes may be enabled or disabled (e.g., via radio resource control (RRC) signaling), which may indicate to a UE whether to interpret the DCI in a first manner (when re-transmission is not enabled) or a second manner (when a retransmission mode is enabled).

In certain aspects, the signaling may explicitly provide an indication of which subframe to retransmit. In other cases, signaling may implicitly provide an indication of the at least one subframe to retransmit based, at least in part, on an association of the at least one subframe with the first HARQ process (e.g., via a mapping between HARQ processes).

In certain aspects, original processes may be triggered via semi-persistent scheduling (SPS). A UE may receive signaling provided with an SPS configuration that configures the UE to automatically retransmit the data on at least one subframe when transmission with the first HARQ process is SPS-triggered. In certain aspects, DCI may be addressed to the SPS-RNTI (semi-persistent scheduling-radio network temporary identifier).

Figure 7:
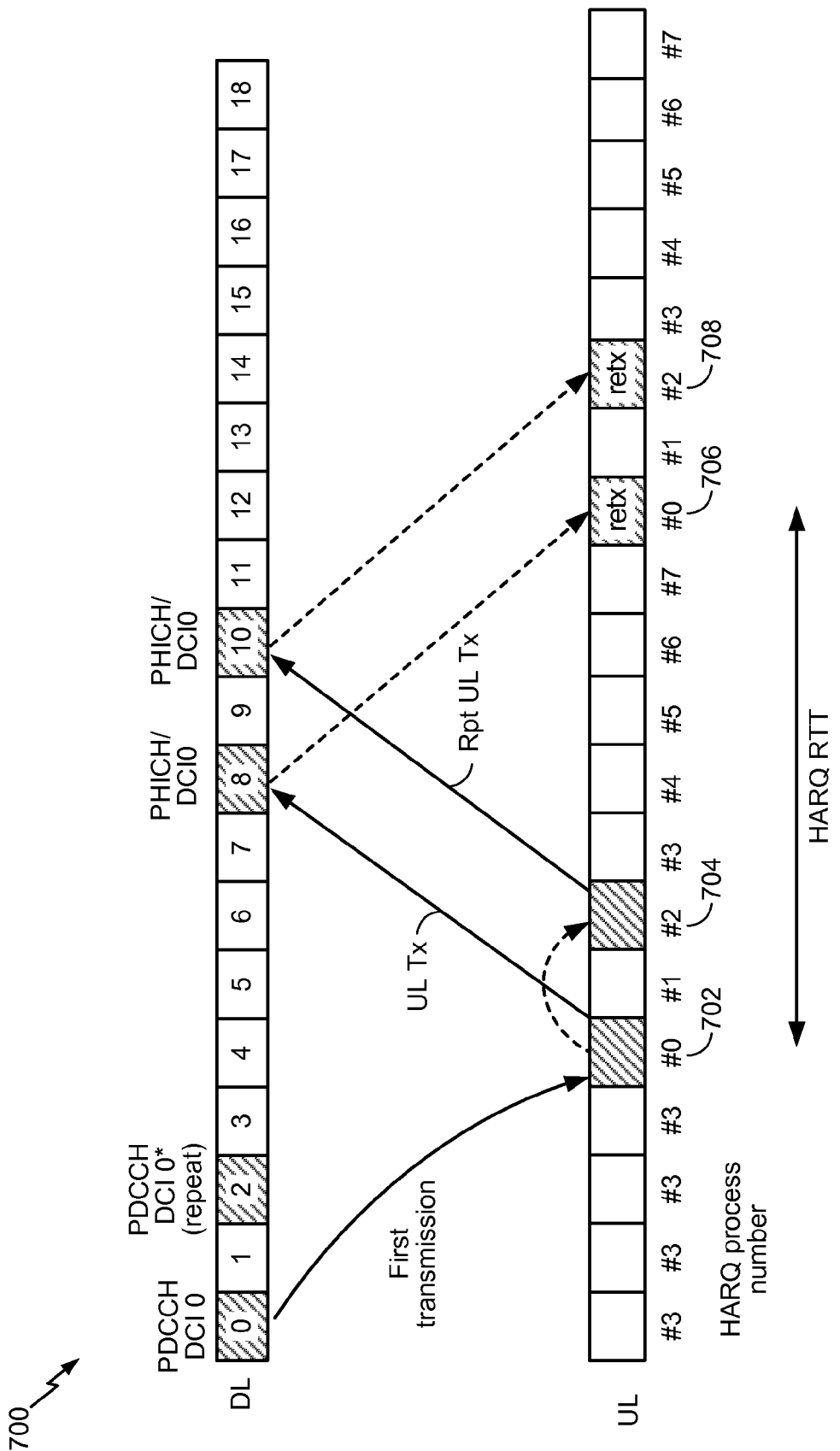
FIGS. 7-10 illustrate example timelines of opportunistic repeated HARQ transmissions, in accordance with certain aspects of the present disclosure.

FIG. 7 illustrates an example timeline 700 of an opportunistic HARQ repetition process. In this example, HARQ process 0 is an original process and HARQ process 2 is a repeated process. For example, HARQ process #2 may be a repetition of original process (i.e., HARQ process #0). In subframe 0, a first message is transmitted to a UE indicating that HARQ process #0 is to be used for uplink transmissions. In subframe 2, the UE receives a second message, which may be, for example, a modified DCI message, indicating that HARQ process #2 is to be used to repeat uplink transmissions performed by HARQ process #0 (e.g., as illustrated by the dashed line between subframes 702 and 704). The original process (HARQ process #0) may perform an uplink transmission in subframe 702, and the repeated process (HARQ process #2) may perform an uplink transmission in subframe 704, which may be a repetition of the uplink transmission in subframe 702. In subframe 8, feedback may be transmitted for the original process, and in subframe 10, feedback may be transmitted for the repeated process. Based on the feedback transmitted in downlink subframes 8 and 10, retransmissions may not need to be performed (e.g., if one or both of transmissions from the original and repeated processes are received successfully) or may be performed by one or both of the original and repeated processes (e.g., in one or both of subframes 706 or 708). For example, HARQ retransmission may be performed on both the original and repeated processes in subframes 706 and 708 while a NAK is received for transmissions made by the repeated process. In certain aspects, individual ACKs may be used to suspend processes separately, but how ACK/NAKs are treated may vary with different implementations.

Figure 8:
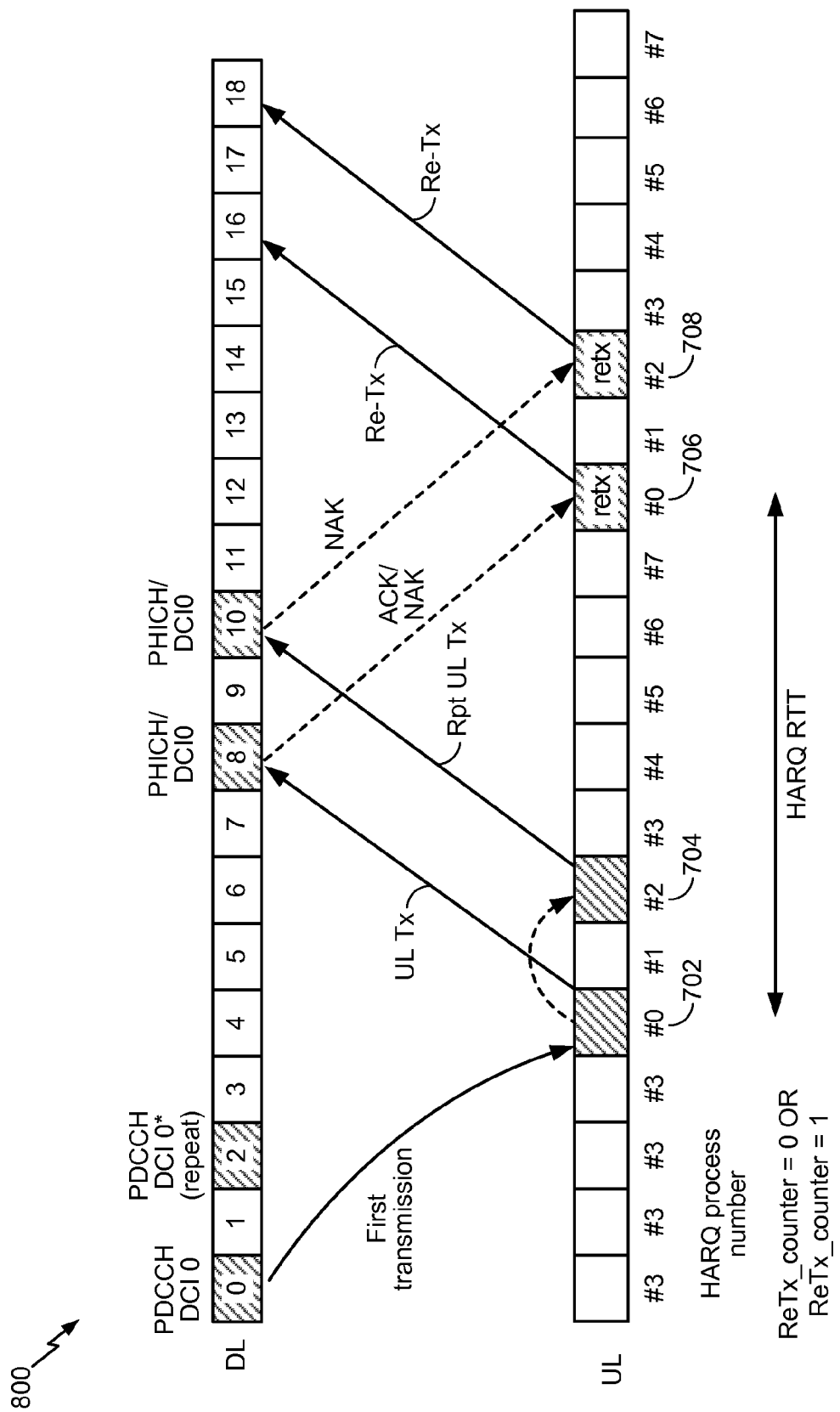

For example, as illustrated in FIG. 8, which illustrates an example timeline 800, in some cases, data may be re-transmitted on both the original and repeated processes (HARQ processes #0 and #2, respectively) when a NAK is transmitted for the repeated process and regardless of whether an ACK or NAK is transmitted for the original process. As illustrated, an ACK or NAK is transmitted in downlink subframe 8, and a NAK is transmitted in downlink subframe 10. The NAK transmitted in downlink subframe 10 may cause the original and repeated processes to perform retransmissions in subframes 706 and 708, respectively, on the uplink.

Figure 9:
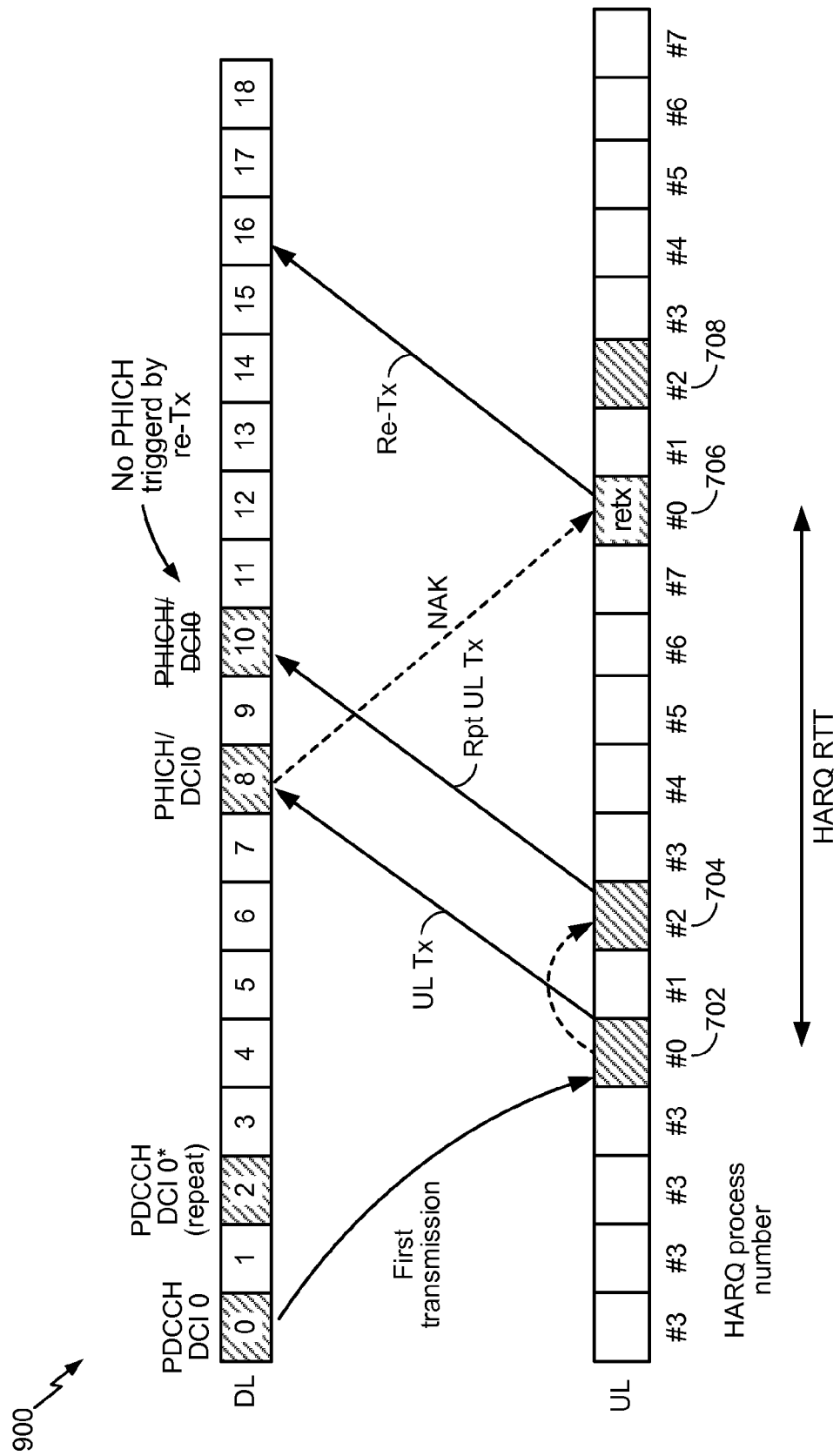

As illustrated in FIG. 9, which illustrates an example timeline 900, in some cases, the repeated process may only be transmitted once (e.g., and no PHICH may be triggered for the repeated process). The original process (HARQ process #0) and repeated process (HARQ process #2) may transmit data on the uplink and trigger feedback in downlink subframe 8 for the original process but not trigger feedback (e.g., a PHICH carrying ACK or NAK) in downlink subframe 10 for the repeated process. As illustrated, a NAK is transmitted in downlink subframe 8, which may trigger a retransmission in subframe 706 by the original process. As no feedback is transmitted for the repeated process, the repeated process need not repeat re-transmissions performed by the original process, thus allowing the repeated process to be used for other data transmissions.

Figure 10:
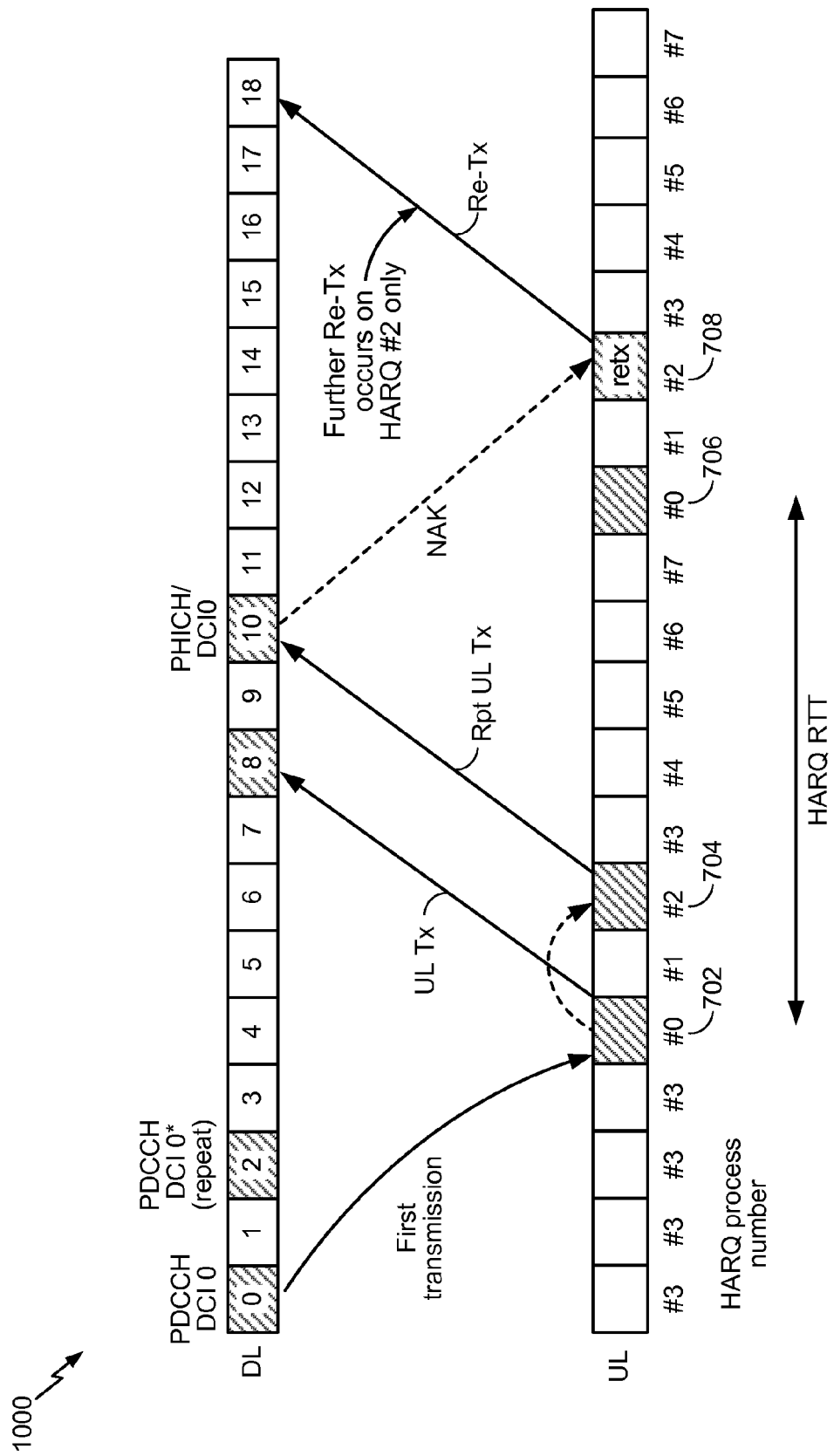

As illustrated in FIG. 10, in some cases, further re-transmissions may only be transmitted on the repeated process (HARQ process #2), which may free up resources for the original process (HARQ process #0). As illustrated in example timeline 1000, feedback may be generated in subframe 10 for a transmission performed on the repeated process, but need not be generated in subframe 8 for a transmission performed on the original process. In response to a NAK transmitted in subframe 10, the repeated process may perform a retransmission (e.g., in subframe 708), and subframe 706 allocated to the original process may be used for other data transmissions.

In certain aspects, a HARQ transmission counter may be implemented for both the original and repetition processes. In certain aspects, counters for the original and repetition processes may be maintained separately. For example, if an original process starts at counter 0, a repetition process with a counter value of 0 may start at original process counter value n. On receipt of an ACK, the process receiving the ACK may restart its counter at 0. In certain aspects, counters for the original and repetition processes may be synchronized. For example, if a repetition process starts when the original counter value is n, the counter for the repetition process is initialized to the value of n. When an ACK is received, both counters may be reset.

Figure 11:
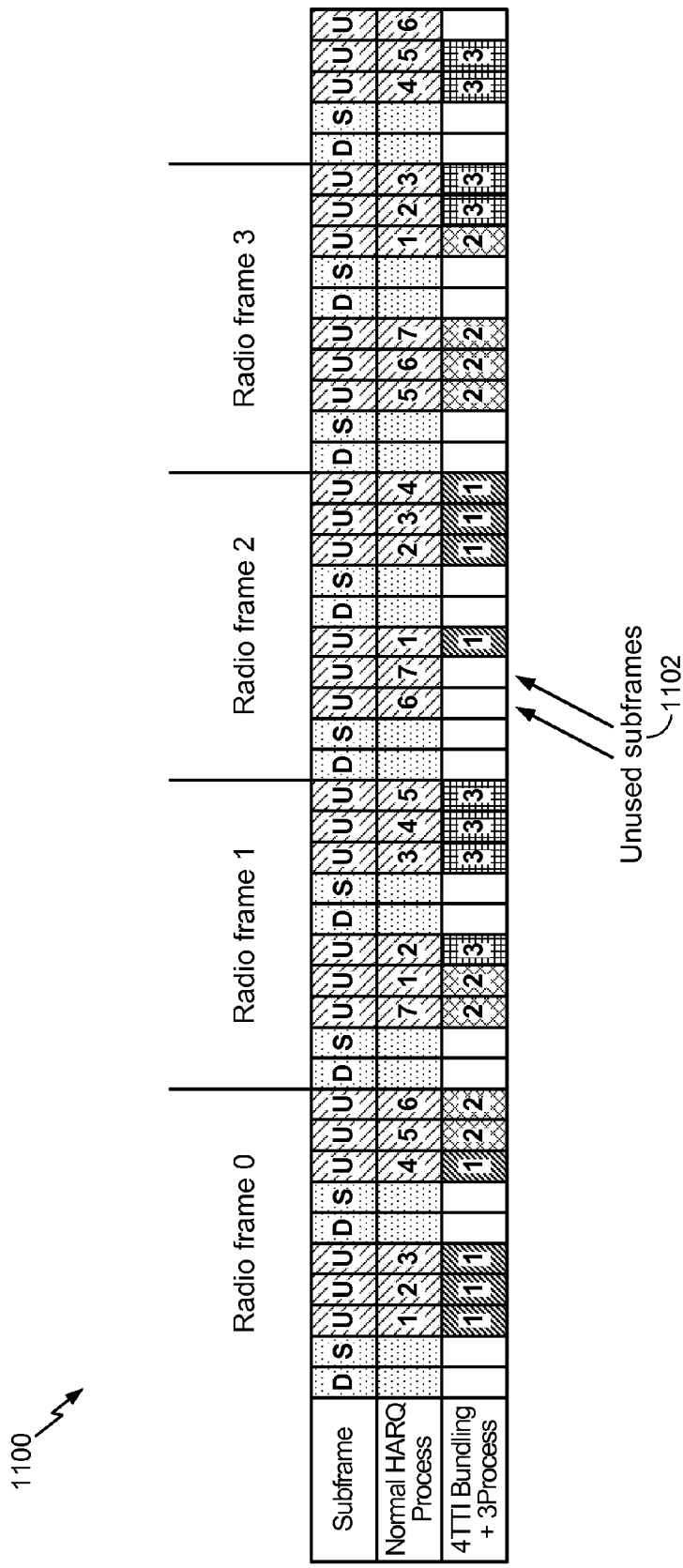
FIG. 11 illustrates example subframes that may be used for opportunistic data repetition in TDD showing unused subframes that may be allocated to other data transmissions.

FIG. 11 illustrates a set of radio frames 1100 showing subframes that may be used for opportunistic repetition. The illustrated example assumes TDD configuration 0 (DSUUU-DSUUU), which can support up to three TTI bundling processes (with a bundling size of 4) and not all subframes are allocated to HARQ (or TTI-bundling) processes. For example, subframes 6 and 7 in radio frame 2 are unused subframes 1102 and may, thus, be used for opportunistic repetition (e.g., by one of HARQ processes 1, 2, or 3).

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in the Figures, those operations may be performed by any suitable corresponding counterpart means-plus-function components.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, PCM (phase change memory), ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available medium that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

As used herein, a phrase referring to "at least one of" a list of items refers to any combination of those items, including single members. As an example, "at least one of a, b, or c" is intended to cover a, b, c, a-b, a-c, b-c, and a-b-c, and any combination of any number of a, b, or c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   transmitting data associated with a first (Hybrid automatic repeat request) HARQ process of a plurality of HARQ processes, wherein a plurality of subframes are allocated to each of the plurality of HARQ processes;
   receiving signaling dynamically allocating at least one subframe for the UE to retransmit the data, the at least one subframe allocated to a HARQ process other than the first HARQ process; and
   retransmitting the data on the at least one subframe.

2. The method of claim 1, wherein the at least one subframe belongs to at least a second HARQ process.

3. The method of claim 1, wherein the signaling is provided via downlink control information (DCI).

4. The method of claim 3, wherein:
   information in the DCI is interpreted in a first manner when a re-transmission mode of the UE is not enabled; and
   information in the DCI is interpreted in a second manner when the re-transmission mode of the UE is enabled.

5. The method of claim 1, wherein:
   transmitting the data associated with the first HARQ process is triggered by semi-persistent scheduling (SPS).

6. The method of claim 1, wherein the signaling provides an indication of the at least one subframe.

7. The method of claim 2, further comprising:
   performing HARQ re-transmissions for one, but not both, of the first and second HARQ processes.

8. A method for wireless communications by a base station (BS), comprising:
   scheduling a UE to transmit data on a first (Hybrid automatic repeat request) HARQ process of a plurality of HARQ processes, wherein a plurality of subframes are allocated to each of the plurality of HARQ processes;
   dynamically allocating at least one subframe for the UE to retransmit the data, the at least one subframe allocated to a HARQ process other than the first HARQ process; and
   signaling the UE to retransmit the data in the at least one subframe.

9. The method of claim 8, wherein the at least one subframe belongs to at least a second HARQ process.

10. The method of claim 8, wherein the signaling is provided via downlink control information (DCI).

11. The method of claim 10, wherein:
    information in the DCI has a first meaning when a re-transmission mode of the UE is not enabled; and
    information in the DCI has a second meaning when the re-transmission mode of the UE is enabled.

12. The method of claim 8, wherein the signaling provides an indication of the at least one subframe.

13. The method of claim 9, further comprising:
    receiving HARQ re-transmissions from the UE for one, but not both, of the first and second HARQ processes.

14. An apparatus for wireless communications by a user equipment (UE), comprising:
    a transmitter configured to transmit data associated with a first hybrid automatic repeat request (HARQ) process of a plurality of HARQ processes, wherein a plurality of subframes are allocated to each of the plurality of HARQ processes; and
    a receiver configured to receive signaling dynamically allocating at least one subframe for the UE to retransmit the data, the at least one subframe allocated to a HARQ process other than the first HARQ process,
    the transmitter configured to retransmit the data on the at least one subframe.

15. The apparatus of claim 14, wherein the at least one subframe belongs to at least a second HARQ process.

16. The apparatus of claim 14, wherein the receiver receives the signaling via downlink control information (DCI).

17. The apparatus of claim 16, wherein:
    information in the DCI is interpreted in a first manner when a re-transmission mode of the UE is not enabled; and
    information in the DCI is interpreted in a second manner when the re-transmission mode of the UE is enabled.

18. The apparatus of claim 14, wherein:
    the transmitter is triggered to transmit the data associated with the first HARQ process by semi-persistent scheduling (SPS).

19. The apparatus of claim 14, wherein the signaling provides an indication of the at least one subframe.

20. The apparatus of claim 15, wherein the transmitter is configured to
    perform HARQ re-transmissions for one, but not both, of the first and second HARQ processes.

21. An apparatus for wireless communications by a base station (BS), comprising:
    a scheduling unit configured to schedule a UE to transmit data on a first hybrid automatic repeat request (HARQ) process of a plurality of HARQ processes, wherein a plurality of subframes are allocated to each of the plurality of HARQ processes,
    the scheduling unit dynamically allocating at least one subframe for the UE to retransmit the data, the at least one subframe allocated to a HARQ process other than the first HARQ process; and
    a transmitter configured to signal the UE to retransmit the data in the at least one subframe.

22. The apparatus of claim 21, wherein the at least one subframe belongs to at least a second HARQ process.

23. The apparatus of claim 21, wherein the transmitter signals the UE to retransmit the data via downlink control information (DCI).

24. The apparatus of claim 23, wherein:
    information in the DCI has a first meaning when a re-transmission mode of the UE is not enabled; and
    information in the DCI has a second meaning when the re-transmission mode of the UE is enabled.

25. The apparatus of claim 21, wherein the signal provides an indication of the at least one subframe.

26. The apparatus of claim 22, wherein HARQ re-transmissions are received from the UE for one, but not both, of the first and second HARQ processes.

* * * * *